United States Patent
Case et al.

[11] 3,715,928
[45] Feb. 13, 1973

[54] VARIABLE SPEED POWER TRANSMISSION

[75] Inventors: Cecil L. Case; Harold Keith Garrison, both of Newton, Kans.

[73] Assignee: Hesston Corporation, Hesston, Kans.

[22] Filed: Oct. 7, 1971

[21] Appl. No.: 187,323

[52] U.S. Cl. ............... 74/218, 74/230.17 A, 74/722
[51] Int. Cl. ........................... F16h 9/00, F16h 11/00
[58] Field of Search ............ 74/230.17 R, 230.17 A, 230.17 D, 74/218, 220, 722

[56] References Cited

UNITED STATES PATENTS 2,799,175  7/1957  Peck ........................................ 74/218
2,930,246  3/1960  Johnson et al. ..................... 74/218 X

*Primary Examiner*—Milton Kaufman
*Assistant Examiner*—Frank H. McKenzie, Jr.
*Attorney*—Schmidt, Johnson, Hovey & Williams

[57] ABSTRACT

A belt transmission having forward and reverse shafts, power driven continuously in opposite directions, utilizes operator-controlled, dual section sheaves for driving one or a pair of output shafts at infinitely variable speeds in either of two directions. Both sections of the operator-actuated sheaves are shiftable axially of their shafts, permitting use of symmetrical belting. Either or both of the output shafts may be driven forwardly or in reverse at selected speeds without interrupting the power to either of the two counter-rotating shafts. When the sections of the continuously rotating sheaves are open, their belts rest upon idler bearings between the sections.

21 Claims, 9 Drawing Figures

INVENTORS.
Cecil L. Case
Harold Keith Garrison

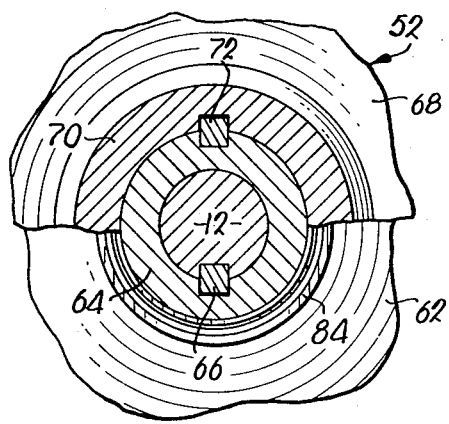
Fig.5.
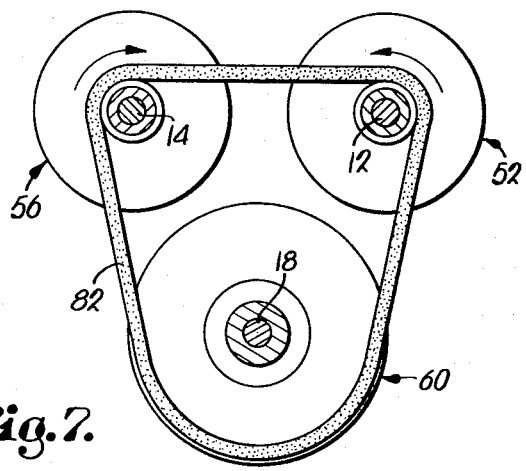
Fig.7.
Fig.8.
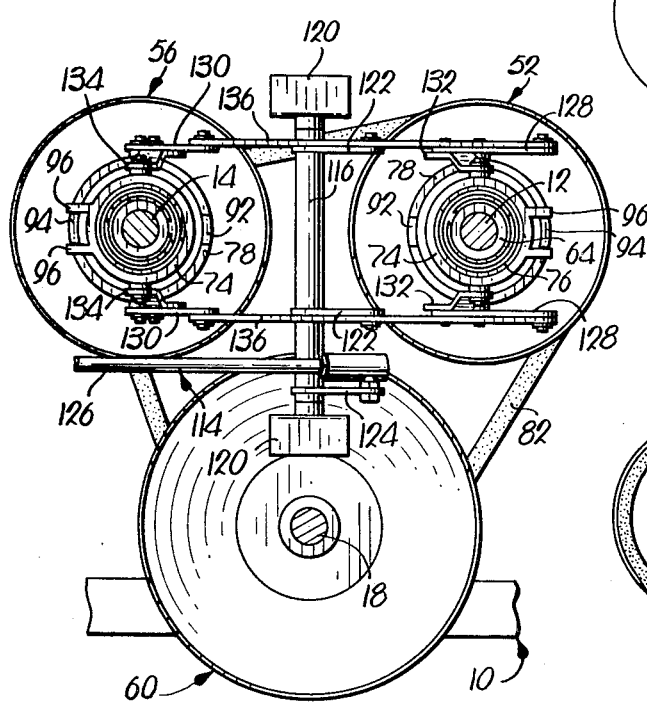
Fig.6.
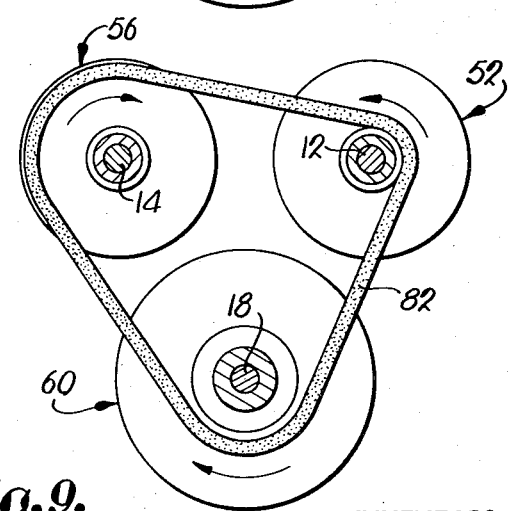
Fig.9.
INVENTORS.
Cecil L. Case
Harold Keith Garrison
BY
Schmidt, Johnson, Hovey & Williams
ATTORNEYS.

VARIABLE SPEED POWER TRANSMISSION

An important object of the present invention is to provide a belt transmission in which operator control is effected solely by changing the effective diameters of variable speed sheaves without need for clutches or any other expensive, complicated, heavy or troublesome mechanisms.

Another important object of the instant invention is the provision of a belt transmission that is especially adaptable for vehicular use in that but one set of controls is used to select direction of travel, change speeds in both directions, and effect steering at all speeds in both directions.

Still another important object of the present invention is the provision of a transmission in which problems of belt misalignment, drag and scuffing are entirely eliminated.

In the drawings:

FIG. 5 is a fragmentary cross-sectional view taken on line 5—5 of FIG. 4;

FIG. 6 is a cross-sectional view taken on line 6—6 of FIG. 1; and

Figures 1, 2:
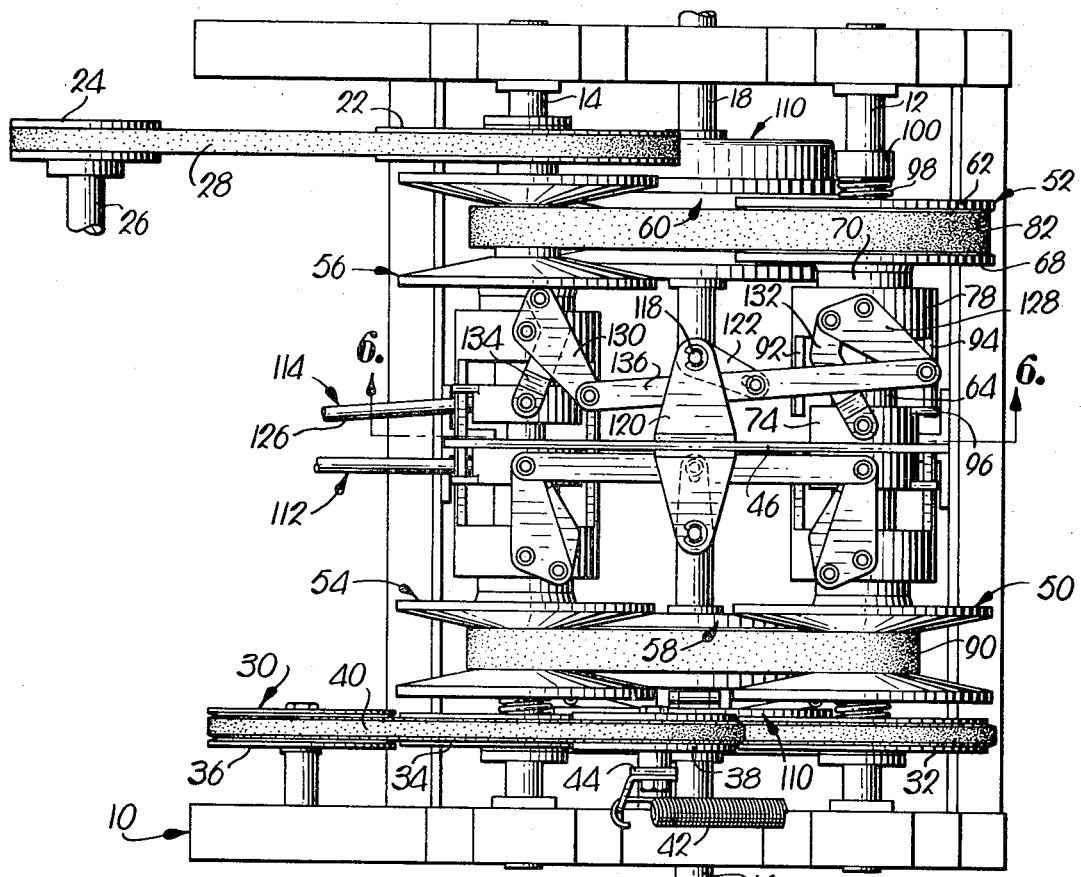
FIG. 1 is a top plan view of a variable speed power transmission made in accordance with the present invention.
FIG. 2 is a side elevational view thereof.

FIGS. 7—9 are vertical cross-sectional views through one of the output shafts and the two upper shafts showing three positions on one of the belts.

A frame 10 rotatably supports a forward shaft 12, a reverse shaft 14 and left and right, end-to-end output shafts 16 and 18 respectively, both in spaced parallelism to shafts 12 and 14. Shaft 14 is driven continuously in the direction indicated by arrows in FIGS. 7—9 by an assembly 20 which includes a pulley 22 on shaft 14, a pulley 24 on a power shaft 26, and a belt 28 interconnecting pulleys 22 and 24. Shaft 12 is driven continuously by shaft 14 in the opposite direction, as indicated by arrows in FIGS. 7—9, by an assembly 30 which includes pulleys 32 and 34 on shafts 12 and 14 respectively, a pair of idler pulleys 36 and 38, and a belt 40 trained over pulleys 32, 34, 36 and 38. Belt 40 is held taut by a spring 42 interconnecting frame 10 and an arm swingable on frame 10 and supporting idler pulley 38. A vertical plate 46 supporting the proximal ends of output shafts 16 and 18 therebetween has clearance openings for shafts 12 and 14, one being shown in FIG. 4 and designated 48. Thus, the preferred structure operably coupled with the shafts 12 and 14 for driving the same continuously in opposite directions, as shown by arrows in FIGS. 7—9, comprises the two assemblies 20 and 30, but other structures may be used within the concepts of the present invention to accomplish the same purposes.

Each of shafts 12, 14, 16 and 18 is provided with a pair of variable speed sheaves and each such sheave has a pair of sections which are shiftable relatively to open and closed positions for varying their effective diameters whereby the shafts 16 and 18 may be driven at various speeds simultaneously or alternately in either of two directions. They include a first or left forward sheave 50 on shaft 12, a second or right forward sheave 52 on shaft 12, a first or left reverse sheave 54 on shaft 14, a second or right reverse sheave 56 on shaft 14, and sheaves 58 and 60 on shafts 16 and 18 respectively which may be driven in either of two directions as shown by arrows in FIGS. 8 and 9.

Figure 4:
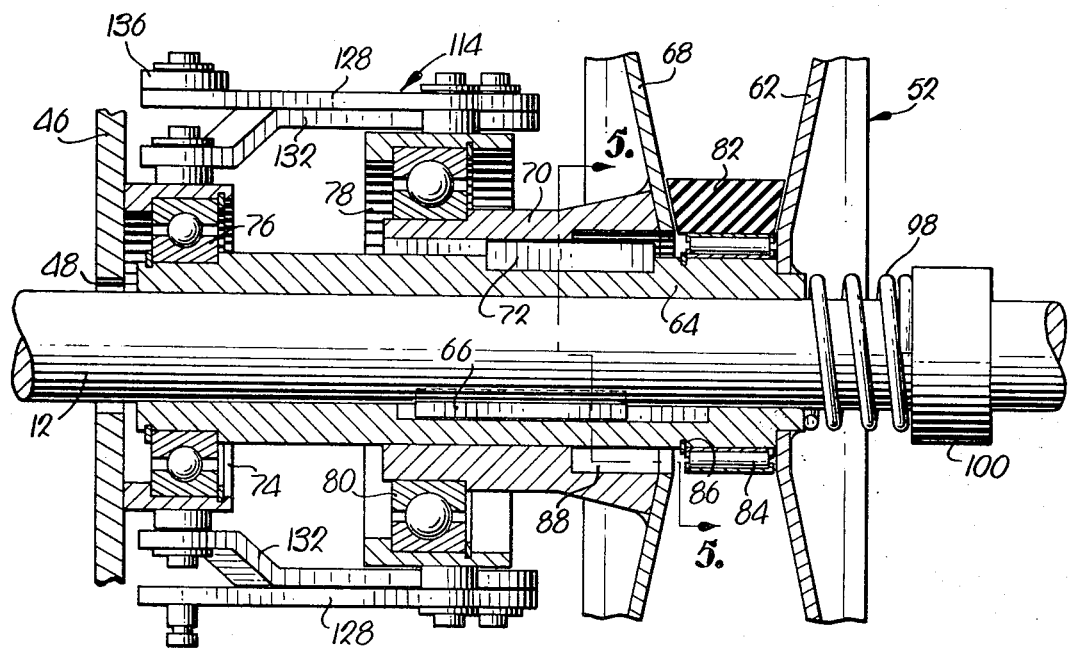
FIG. 4 is an enlarged, fragmentary, vertical cross-sectional view through one of the sheaves of one of the upper shafts.

Since sheaves 50, 52, 54 and 56 are identical, only sheave 52 and its associated parts will be described, particularly as shown in FIGS. 4 and 5. Outer section 62 of sheave 52 is secured rigidly to a sleeve 64 which rotates with shaft 12 and slides axially therealong by virtue of a key 66. Inner section 68 of sheave 52 is secured to a sleeve 70 which rotates with sleeve 64 and slides axially therealong by virtue of a key 72.

A collar 74 is movable toward and away from stop plate 46 and a bearing 76 interposed between sleeve 64 and collar 74 permits sleeve 64 to rotate relative to collar 74 but causes the latter to reciprocate with sleeve 64 axially of shaft 12. A collar 78 is movable toward and away from stop plate 46 and and a bearing 80 interposed between sleeve 70 and collar 78 permits sleeve 70 to rotate relative to collar 78 but causes the latter to reciprocate with sleeve 70 axially of shaft 12.

When sections 62 and 68 of sheave 52 are open as shown in FIG. 4, or when they are spread apart still farther, as indicated in FIG. 1 with respect to the sections of sheave 56, belt 82 rides on an idler 84 in the nature of a roller bearing surrounding sleeve 64 and held in place between section 62 and a ring 86 around sleeve 64. A cavity 88 in sleeve 70 around sleeve 64 and opening toward idler 84 clears the latter when sections 62 and 68 are closed. Belt 82 is common to sheaves 52, 56 and 60 as best seen in FIGS. 7—9. Sheaves 50, 54 and 58 are similarly provided with a common belt 90 as illustrated in FIGS. 1—3.

Figure 3:
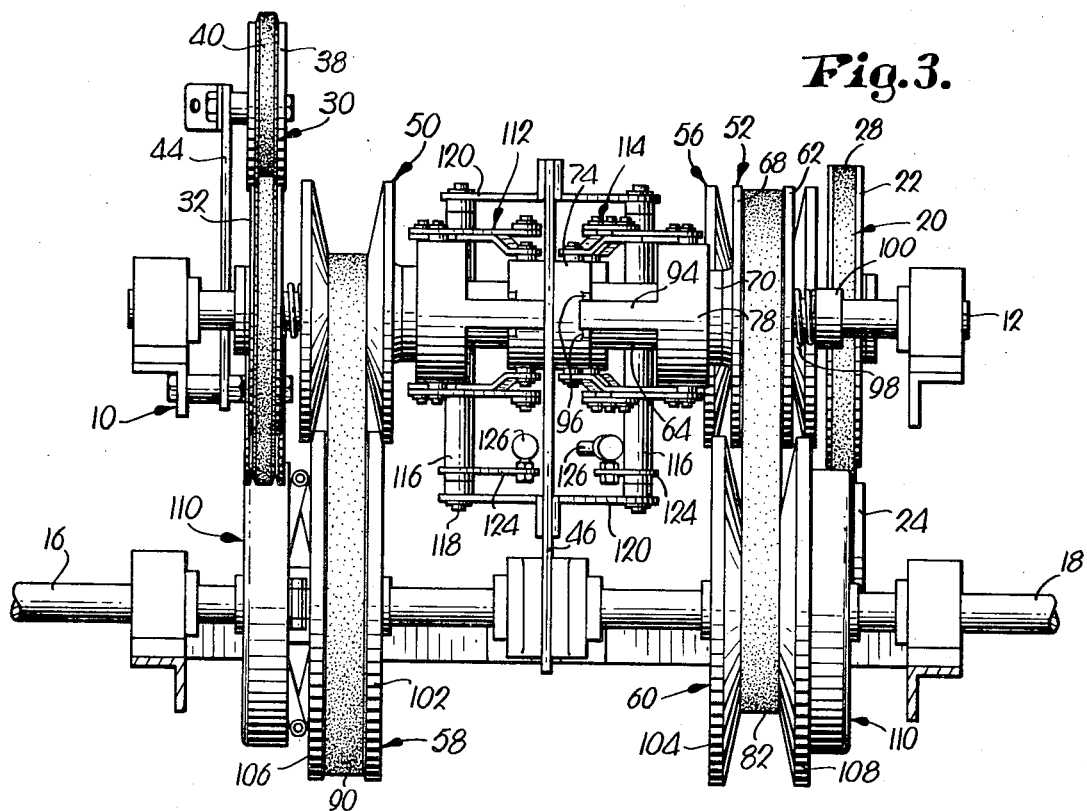
FIG. 3 is a rear elevational view thereof.

Collar 78 has a pair of diametrically opposed arms 92 and 94 extending toward and adapted to abut plate 46, but shown spaced therefrom in FIGS. 1 and 3. Arms 92 and 94 embrace collar 74 and a pair of fingers 96, extending outwardly from collar 74, embrace the arm 94, as seen best in FIGS. 1, 3 and 6, to hold collars 74 and 78 against relative rotation. It is to be noted that collars 74 and arms 92, 94 of sheaves 52 and 56 move toward and away from the right face of plate 46 whereas collars 74 and arms 92, 94 of sheaves 50 and 54 move toward and away from the left face of plate 46. "Right" and "left" as used throughout herein is in reference to FIG. 3.

A spring 98 coiled on shaft 12 between sleeve 64 and a collar 100 fixed to shaft 12 yieldably biases the collar 74 toward the plate 46. The corresponding spring 98 on shaft 14 for sheave 56 is hidden from view in FIG. 1 by the outer concave configuration of the outer section of sheave 56. No collars 100 are needed for the spring 98 of sheaves 50 and 54 because they abut pulleys 32 and 34 respectively. All four springs 98 operate to yieldably bias the transmission toward neutral.

The inner sections 102 and 104 of the sheaves 58 and 60 respectively are fixed to their shafts 16 and 18, but the outer sections 106 and 108 thereof are shiftable axially of the shafts 16 and 18. Sections 106 and 108 may be controlled in both directions along shafts 16 and 18 by units 110 such as springs, centrifugal weights, ramps or combinations thereof.

Since controls 112 and 114 for sheaves 50, 54 and sheaves 52, 56 respectively are identical, the details of control 114 only will be described. It includes an upright tube 116 on a pin 118 carried by two brackets 120 fixed to plate 46. Tube 116 has two radial cranks 122 and a radial crank 124, the latter of which is actuated by a push-pull rod 126 pivotally connected thereto. Rods 126 may be reciprocated by a steering wheel, by one or more levers, or by any other suitable mechanism, not shown.

Upper and lower bell cranks 128 and upper and lower bell cranks 130 are swingably attached to collars 78 of sheaves 52 and 56 respectively. Upper and lower links 132 pivotally interconnect bell cranks 128 and collar 74 of sheave 52, whereas upper and lower links 134 pivotally interconnect bell cranks 130 and collar 74 of sheave 56. Upper and lower bars 136 pivotally interconnect bell cranks 128 and 130 and are pivotally coupled with radial cranks 122. Arrangements other than controls 112 and 114 may be used within the principles of the present invention to actuate the sheaves 50–56.

In the following description of operation it shall be assumed that the transmission is used in connection with a trail bike, motor bike, garden tractor, riding lawn mower, farm implement, all-terrain vehicle, or the like, with each shaft 16 and 18 operably connected to a ground-engaging wheel (not shown), it being understood, however, that the invention is not limited in its use to vehicular adaptation because either or both of the shafts 16 and 18 may be coupled with various types of mechanisms.

In the neutral positions of belts 82 and 90, as illustrated in FIG. 7 with respect to belt 82, shafts 12 and 14 continue to rotate in opposite directions without driving sheaves 58 and 60 in either direction because of the idler bearings 84. Sections 62 and 68 of all four sheaves 50, 52, 54 and 56 are spaced from their respective belts 82 and 90 and the latter engage the bearings 84 as shown in FIG. 4. The neutral position of belt 90 is also illustrated in FIGS. 1–3. But, while belt 82 is shown in neutral by FIGS. 4 and 5, it is illustrated by FIGS. 1, 3, 6 and 8 in position for driving sheave 60 forwardly at full speed and in the same direction of rotation as sheave 52.

This is accomplished by actuation of control 114 such as to push the rod 126 rearwardly to its maximum. This swings the corresponding lower radial crank 124 rearwardly, rotates tube 116 and swings upper radial cranks 122 in the same direction as seen in FIG. 1. Cranks 122 shift bars 136 rearwardly to rotate bell cranks 128 and 130 anticlockwise, viewing FIG. 1. Cranks 128 move collar 78 of sheave 52 and, therefore, sleeve 70 and section 68 toward section 62, causing arms 92 and 94 to move away from plate 46. Such action takes place as links 132 hold the collar 74 against the plate 46, resulting in movement of belt 82 to the outer periphery of sheave 52.

At the same time, bell cranks 130 pull on links 134 to pull collar 74 of sheave 56 away from plate 46 as cranks 130 hold the arms 92 and 94 of sheave 56 tightly against plate 46. This shifts sleeve 64 and section 62 of sheave 56 against the action of springs 98 (not shown in FIG. 1) such that the distance between sections 62 and 68 of sheave 56 is greater, as seen in FIG. 1, than the distance therebetween in neutral, as shown by FIG. 4. Belt 82 drops into engagement with bearing 84 of sheave 56 such that it is not actuated by sheave 56 but is driven solely by sheave 52.

These actions result in an increase in the distance between the sections 104 and 108 of sheave 60 to cause belt 82 to move inwardly in sheave 60 toward shaft 18 as seen in FIGS. 3 and 8. Section 108 yields away from section 104, and as belt 82 slides inwardly along the convex inner face of section 104, it shifts axially of shafts 12, 14 and 18 toward section 108 as it is permitted to do because of the aforementioned increased distance between sections 62 and 68 of sheave 56 and the yieldability of the spring 98 of sheave 52.

In use with a vehicle, the position of belts 82 and 90 in FIGS. 1 and 8 causes a turn to the left as the ground wheel on shaft 18 rotates forwardly and the ground wheel on shaft 16 receives no power in either direction from belt 90. Conversely, if control 112 is actuated to drive sheave 58 forwardly while control 114 remains in neutral, the vehicle will turn to the right. Or, if rod 126 of control 114 is pulled forwardly while control 112 remains in neutral, sheave 60 will be driven in reverse by sheave 46, as shown in FIG. 9, to cause the vehicle to turn right. And again, conversely, if rod 126 of control 112 is pulled forwardly while control 114 remains in neutral, sheave 58 will be driven in reverse by sheave 54 to cause the vehicle to turn left.

If a sharp turn to the left is desired, rod 126 of control 114 is pushed rearwardly and the rod 126 of control 112 is pulled forwardly. This causes sheave 52 to drive the wheel on shaft 18 forwardly and causes sheave 54 to drive the wheel on shaft 16 rearwardly. A sharp turn to the right is effected by causing sheave 56 to drive shaft 18 rearwardly and causing sheave 50 to drive shaft 16 forwardly. Manifestly, because of the variable speed characteristics of all of the sheaves 50, 52, 54, 56, 58 and 60, the speeds of all turns are determined by the extent to which either or both rods 126 are pushed or pulled. It is to be noted at this juncture in FIG. 1 that the radial cranks 122 extend in the same direction as shafts 16 and 18 when the transmission is in neutral, extend rearwardly at an angle when shafts 16 and 18 are driven by sheaves 50 and 52, and extend forwardly at an angle when shafts 16 and 18 are driven by sheaves 54 and 56.

Accordingly, when both controls 112 and 114 are actuated to push the rods 126 rearwardly to their fullest extent, shafts 16 and 18 will be rotated in one direction at the same speed, and when rods 126 are pulled forwardly to their fullest extent, shafts 16 and 18 will be rotated in the opposite direction at the same speed. The speeds of shafts 16 and 18 may then be infinitely varied in either direction by manipulation of controls 112 and 114. If used on a vehicle, either or both of the controls 112 and 114 may be used to effect slight or extensive steering to the left or to the right, both forwardly and in reverse.

In the event that asymmetrical belts, beveled on one side only, are used in lieu of the double bevel, symmetrical belts 82 and 90, satisfactory results may well be obtained by shifting but one section 62 or 68 of the sheaves 50–56.

Having thus described the invention, what is claimed as new and desired to be secured by Letters Patent is:

1. In a transmission, a forward shaft, a reverse shaft and an output shaft provided with variable speed forward, reverse and output sheaves respectively, each sheave having a pair of sections shiftable relatively to open and closed positions for varying the effective diameter thereof;

a belt interconnecting the sheaves;

structure operably coupled with the forward and reverse shafts for driving the same continuously in opposite directions; and a control operably coupled with the forward and reverse sheaves for alternately opening and closing the same to drive the output shaft in either of two directions.

2. In a transmission as claimed in claim 1 wherein one of the sections of the output sheave is rigid to the output shaft, said control being adapted to open the forward and reverse sheaves sufficiently to permit movement of the belt axially of the shafts as the direction of rotation of the output shaft is changed.

3. In a transmission as claimed in claim 1 wherein said forward and reverse sheaves are provided with idlers disposed to receive the belt when either or both of said forward and reverse sheaves are open.

4. In a transmission as claimed in claim 3 wherein the idlers are bearings surrounding the forward and reverse shafts and disposed between the sections of the forward and reverse sheaves when the latter are open for engagement by the belt.

5. In a transmission as claimed in claim 1 wherein both sections of the forward and reverse sheaves are shiftable and operably coupled with said control.

6. In a transmission as claimed in claim 5 wherein is provided resilient means for one section of the forward sheave and resilient means for one section of the reverse sheave for yieldably biasing the same toward a position placing the transmission in neutral.

7. In a transmission as claimed in claim 5 wherein both sections of the forward and reverse sheaves are provided with elongated sleeves rigidly secured thereto and attached to the corresponding forward and reverse shafts for rotation therewith, said sleeves being shiftable axially of the corresponding forward and reverse shafts in response to actuation of said control.

8. In a transmission as claimed in claim 7 wherein is provided a stop common to all of said sleeves for limiting the extent of axial movement thereof in one direction.

9. In a transmission as claimed in claim 7 wherein said forward and reverse sheaves are provided with idler bearings disposed to receive the belt when either or both of said forward and reverse sheaves are open, one sleeve of the forward sheave and one sleeve of the reverse sheave being journaled in the corresponding bearing.

10. In a transmission as claimed in claim 9 wherein said one sleeve of the forward sheave is slidable axially on the forward shaft and said one sleeve of the reverse sheave is slidable axially on the reverse shaft.

11. In a transmission as claimed in claim 7 wherein one sleeve of the forward sheave is slidable on the forward shaft axially of the latter and one sleeve of the reverse sheave is slidable on the reverse shaft axially of the latter.

12. In a transmission as claimed in claim 11 wherein the other sleeve of the forward sheave is slidable on and axially of said one sleeve of the forward sheave and the other sleeve of the reverse sheave is slidable on and axially of said one sleeve of the reverse sheave.

13. In a transmission as claimed in claim 7 wherein said control includes a collar operably coupled with each sleeve respectively and shiftable axially of the corresponding forward and reverse shafts.

14. In a transmission as claimed in claim 13 wherein the collars surround the corresponding sleeves and shafts and are provided with bearings therewithin for rotation of the sleeves relative to the collars.

15. In a transmission as claimed in claim 14 wherein the collars surrounding the forward shaft are provided with an interlock holding the same against relative rotation and wherein the collars surrounding the reverse shaft are provided with an interlock holding the same against relative rotation.

16. In a transmission, a forward shaft provided with a first and a second variable speed, forward sheave;

a reverse shaft provided with a first and a second, variable speed, reverse sheave;

a first output shaft provided with a variable speed, output sheave;

a second output shaft provided with a variable speed, output sheave, each sheave having a pair of sections shiftable relatively to open and closed positions for varying the effective diameters thereof;

a first belt interconnecting the first forward sheave, the first reverse sheave and the output sheave of the first output shaft;

a second belt interconnecting the second forward sheave, the second reverse sheave and the output sheave of the second output shaft;

structure operably coupled with the forward and reverse shafts for driving the same continuously in opposite directions;

a first control operably coupled with the first forward sheave and the first reverse sheave for alternately opening and closing the same to drive the first output shaft in either of two directions; and a second control operably coupled with the second forward sheave and the second reverse sheave for alternately opening and closing the same to drive the second output shaft in either of two directions.

17. In a transmission as claimed in claim 16 wherein is provided a power shaft, wherein said structure includes a first belt and pulley assembly coupled with the power shaft and with the reverse shaft for rotating the latter continuously in one direction, and wherein said structure includes a second belt and pulley assembly coupled with the reverse shaft and with the forward shaft for driving the latter continuously from the reverse shaft in a direction opposite to the direction of rotation of the reverse shaft.

18. In a transmission as claimed in claim 16 wherein said output shafts are in end-to-end relationship and in spaced parallelism with said forward shaft and with said reverse shaft.

19. In a transmission as claimed in claim 16 wherein the forward and reverse sheaves are each provided with an idler for receiving the corresponding belt when the same are open.

20. In a transmission as claimed in claim 16 wherein both sections of the first forward sheave and of the first reverse sheave are shiftable and operably coupled with the first control, and wherein both sections of the second forward sheave and of the second reverse sheave are shiftable and operably coupled with the second control.

21. In a transmission as claimed in claim 20 wherein the first output shaft has one section of its output sheave rigid thereto and the second output shaft has one section of its output sheave rigid thereto, said controls being adapted to open the forward and reverse sheaves sufficiently to permit movement of the belts axially of the shafts as the directions of rotation of the output shafts are changed.

* * * * *